United States Patent [19]

Bartl

[11] Patent Number: 4,475,978

[45] Date of Patent: Oct. 9, 1984

[54] LABEL APPLICATOR AND METHOD FOR LABELING THE FORWARD FACES OF ARTICLES

[75] Inventor: James C. Bartl, LaHabra, Calif.

[73] Assignee: Label-Aire Inc., Fullerton, Calif.

[21] Appl. No.: 461,699

[22] Filed: Jan. 28, 1983

Related U.S. Application Data

[62] Division of Ser. No. 267,252, May 26, 1981, Pat. No. 4,390,386.

[51] Int. Cl.$^3$ ...................... B32B 31/00; B65H 25/00; B44C 1/00; B65C 9/18

[52] U.S. Cl. .................................... 156/497; 156/361; 156/542; 156/DIG. 38; 156/285

[58] Field of Search ............... 156/497, 488, 541, 542, 156/475, 477 R, DIG. 24, DIG. 25, DIG. 27, DIG. 31, DIG. 38, 361, 364, 584, 249, 285

[56] References Cited

U.S. PATENT DOCUMENTS

| | | | |
|---|---|---|---|
| 3,871,943 | 3/1975 | Zodrow | 156/DIG. 31 |
| 4,181,561 | 1/1980 | Seragnoli | 156/475 |
| 4,255,220 | 3/1981 | Kucheck et al. | 156/542 |
| 4,293,365 | 10/1981 | Geyser et al. | 156/DIG. 25 |
| 4,316,762 | 2/1982 | Martin | 156/488 |

*Primary Examiner*—Edward Kimlin
*Assistant Examiner*—L. Falasco
*Attorney, Agent, or Firm*—Gordon L. Peterson

[57] ABSTRACT

A method of labeling articles, including moving articles in a row through a labeling station, dispensing the label onto a labeling head and advancing the labeling head into the path of movement of the articles at the labeling station. The label is transferred from the labeling head to the forward face of the article at the labeling station while the labeling head is in the path of movement of the articles. The labeling head is then retracted from the path of movement of the articles.

11 Claims, 5 Drawing Figures

Fig. 1
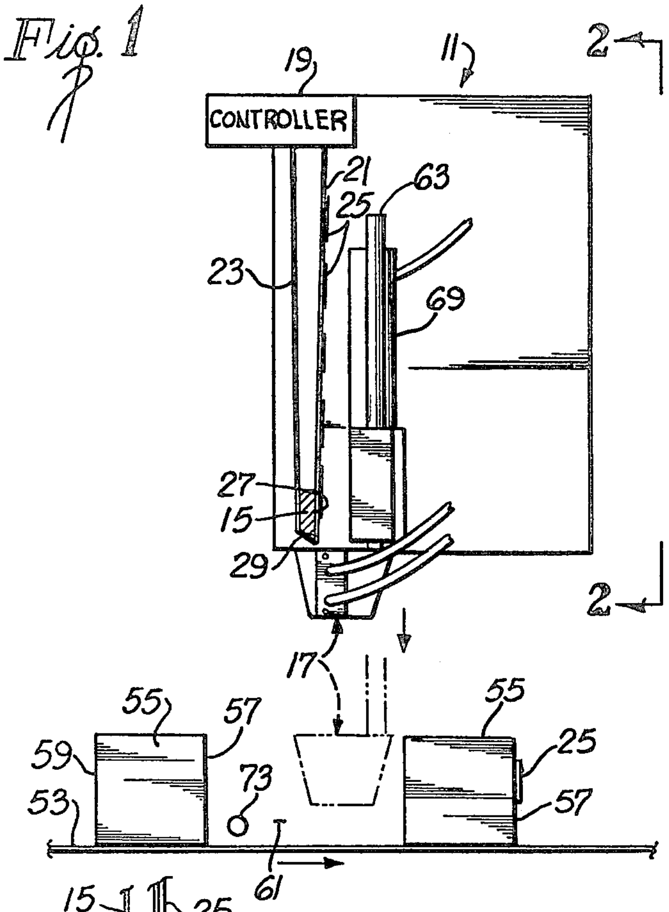
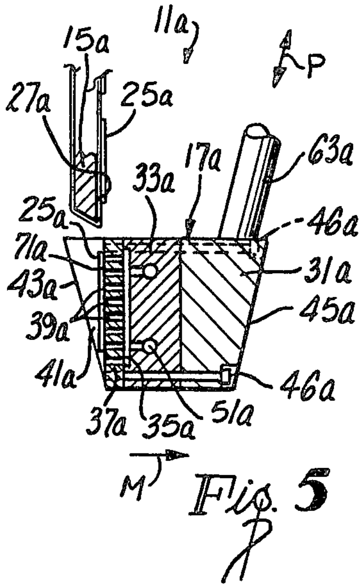
Fig. 5
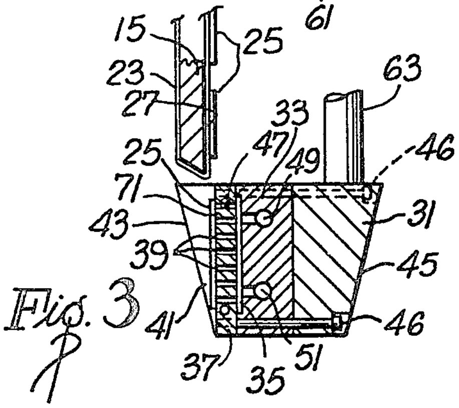
Fig. 3
Fig. 2
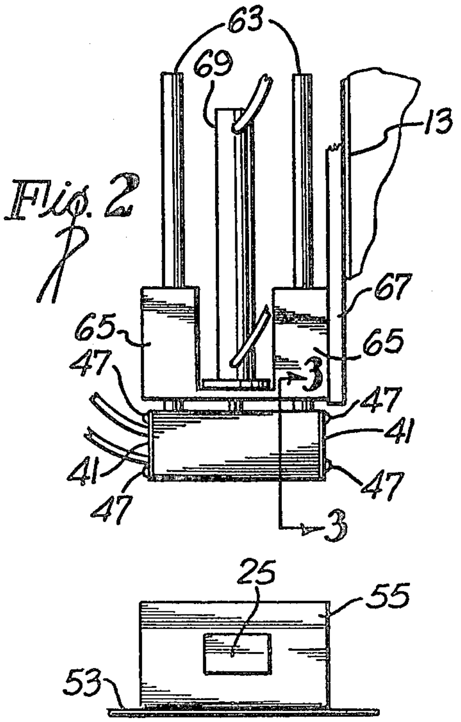
Fig. 4
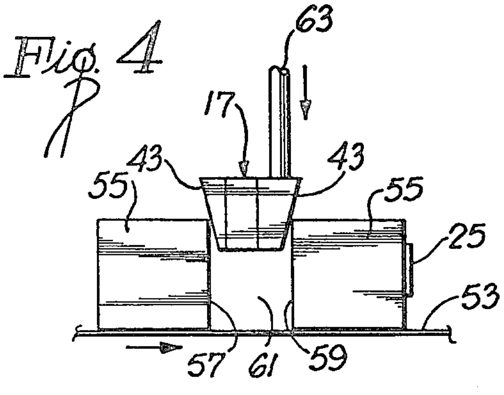

LABEL APPLICATOR AND METHOD FOR LABELING THE FORWARD FACES OF ARTICLES

BACKGROUND OF THE INVENTION

This application is a division of application Ser. No. 267,252, filed 5/26/81, now U.S. Pat. No. 4,390,386.

Pressure-sensitive labels are typically applied to articles by label applicators which blow and/or tamp the labels onto the articles. Label applicators of this type apply the labels to the top, bottom or sides of the article as the article is moved through a labeling station. Thus, in the case of a rectangular article, the face which receives the label lies in a plane which is generally parallel to the direction of movement of the article.

It is sometimes necessary or desirable to apply a label to the forward or rear face of an article. The forward face is the face which faces forwardly in the direction of movement of the article, i.e., the leading face, and the rear face is the face which faces rearwardly. In many cases, the article cannot be turned on the conveyor to convert the forward face to a top or side face of the article. Unlike typical prior art labeling, labeling of the forward or rear face requires labeling a face which is generally transverse to the direction of movement of the article. Prior art label applicators and processes cannot be used to label such transverse faces.

SUMMARY OF THE INVENTION

This invention provides a label applicator and method for applying labels to the transverse faces of articles, such as the forward and rear faces, as well as to relatively inaccessible surfaces. This is accomplished by advancing a labeling head having a label thereon into the path of movement of the articles, transferring the labels to the forward or rear face of the article and retracting the labeling head from the path of movement of the articles.

Movable labeling heads or label receivers are known. For example, it is known to use drums rotated unidirectionally to transfer various forms of sheet stock from one position to another, and constructions of this tye are shown, for example, in Rudszinat et al U.S. Pat. No. 3,250,278, Paxton et al U.S. Pat. No. 3,910,811, Cohn U.S. Pat. No. 4,003,780, McDavid et al U.S. Pat. No. 3,938,698, Helm U.S. Pat. No. 3,957,570, Radzins U.S. Pat. No. 3,772,120, Zimpel U.S. Pat. No. 2,668,632 and Hottendorf U.S. Pat. No. 3,684,627. However, drums would not be effective in labeling the forward or rear face of an article in that the drum would be struck by the articles to be labeled.

Crankshaw et al U.S. Pat. No. 4,210,484 discloses the use of multiple movable label receivers for the purpose of spreading labels. Also, Crankshaw et al U.S. Pat. No. 4,255,220 discloses a label applicator in which a label receiver is linearly reciprocable between retracted and extended positions. Common assignee's U.S. Pat. No. 4,337,108 shows a related form of label applicator in which the label receiver pivots in both directions about a pivot axis. Both of these latter two label applicators are adapted for labeling the top, bottom and sides of an article, and are not suited for labeling an article face which lies generally transverse to the direction of movement of the article.

The label applicator of this invention uses a labeling head which is movable in a particular direction and in a particular manner to accomplish labeling of an article face which is transverse to the direction of movement of the article. Broadly, the direction of movement is such that the labeling head can be extended into the path of movement of the articles, with the label lying in a plane which is also generally transverse to the path of movement of the articles.

The path of movement of the label head may be radial or inclined with respect to direction of motion of the article. One advantage of an appropriately inclined label head path is that, during retraction, the path has a component which extends generally in the direction of movement of the articles through the labeling station. Thus, retraction of the label head moves the label head away from the article just labeled along a path which is inclined in the direction of movement of such article to reduce the likelihood of contact between the label head and the article. Although the method and label applicator of this invention are preferably used to label a forward or rear face of an article or a surface which is relatively inaccessible, i.e., sufficiently remote or obstructed so that the entire label applicator, including label dispenser, cannot be positioned closely adjacent to it, they can also be used to label other article surfaces.

The labels are preferably supplied on an elongated backing strip, and the backing strip is moved over a peeler member having a peeling edge. The backing strip is moved over the peeler member generally in a first direction toward the peeling edge and over the peeling edge to remove labels from the backing strip. A labeling head is mounted on a supporting structure for movement between a retracted position in which the labeling head is adjacent the peeler member to receive removed labels from the backing strip and an extended position. In one embodiment, the labeling head moves along a path which extends generally in said first direction in moving between the retracted and extended positions. This enables the label receiver to be advanced into the path of movement of the articles and then retracted following transfer of the label so that the labeling head does not interfere with article movement. Viewed from another perspective in this same embodiment, the peeler member may include a peeler bar having a surface over which the backing strip is moved in moving toward the peeling edge. This surface extends generally in the direction of movement of the labeling head in moving between the extended and retracted positions.

In order to label an article face which is transverse to the direction of movement of the articles, there must exist a predetermined minimum spacing between articles at the labeling station. However, so long as the articles are spaced by at least this minimum amount, the articles can be randomly spaced. The use of a sensor to sense the presence of an article at the labeling station contributes to the ability of the label applicator to label randomly spaced articles which have at least the required minimum spacing.

The required minimum spacing is preferably sufficient to provide sufficient time for extending and retracting the labeling head and for transferring the label to the article. However, if desired, the minimum spacing can be less than the maximum dimension of the labeling head in the direction of movement of the articles. When this latter form of minimum spacing is used, the articles are preferably wedged apart at the labeling station during the advancing of the labeling head to define the necessary gap. The wedging step can advantageously be carried out by using the labeling head by inclining the opposite side surfaces of the labeling head as they extend generally in the first direction. Although the labeling process of this invention can be carried out with the articles moving continuously through the labeling station, if desired, it is peferred to move the articles intermittently through the labeling station if the wedging features of the invention are to be employed so that the articles are not being externally driven during the wedging step.

The invention, together with further features and advantages thereof, may best be understood by reference to the following description taken in connection with the accompanying illustrative drawing.

BRIEF DESCRIPTION OF THE DRAWING

FIG. 1 is a side elevational view of one form of label applicator constructed in accordance with the teachings of this invention and with the labeling head in the retracted position.

FIG. 2 is a fragmentary elevational view of the label applicator taken generally along line 2—2 of FIG. 1.

FIG. 3 is an enlarged sectional view taken generally along line 3—3 of FIG. 2 and showing one preferred form of labeling head.

FIG. 4 is a fragmentary side elevational view similar to FIG. 1 with the labeling head approaching the extended position and being used to wedge apart the articles to be labeled.

FIG. 5 is a sectional view similar to FIG. 3 showing a second embodiment of the invention in which the label head is moved along a path which is inclined with respect to the direction of movement of the articles through the labeling station.

DESCRIPTION OF THE PREFERRED EMBODIMENTS

FIGS. 1 and 2 show a label applicator 11 which generally includes a supporting structure 13, a peeler bar 15 mounted on the supporting structure, a labeling head or label receiver 17 and a conventional controller 19 which sequentially moves a label strip 21 in a well-known manner over the peeler bar 15. The label strip 21 includes a web or backing strip 23 of suitable release paper and pressure sensitive adhesive labels 25 releasably adhered to one side of the backing strip. The backing strip 23 is elongated and, in the embodiment illustrated, carries a single row of the labels 25.

The peeler bar 15 may be of conventional construction and has a generally flat, planar surface 27 extending in a first direction and leading to a peeling edge 29. The label strip 21 passes over the surface and the peeling edge 29, and in so doing, the labels 25 are sequentially removed from the backing strip. The controller 19 indexes the label strip 21, and with each indexing movement of the label strip, one of the labels 25 is removed from the backing strip 23 by the peeler bar 15 in a well-known manner.

Although the labeling head 17 can be of various different constructions, in the embodiment illustrated, it includes a pad 31, a manifold 33 defining a manifold chamber 35, a grid 37 having passages 39 extending therethrough and a pair of flanges 41. The pad 31 and the flanges 41 define opposite side surfaces 43 and 45 which are inclined toward each other as they extend downwardly as viewed in FIG. 3 to thereby form wedging surfaces. The manifold 33 is sandwiched between the pad 31 and the grid 37 by threaded fasteners 46. The flanges 41 are attached to the grid 37 by screws 47 (FIG. 2). The manifold chamber 35 and the passages 39 are selectively supplied with vacuum and positive air pressure, respectively, via a vacuum port 49 and a pressure port 51. In the embodiment illustrated, the vacuum is pulled continuously on the manifold chamber 35 and a blast of air is supplied through the pressure port 51 to the manifold chamber 35 and the passages 39 as required for transferring labels from the labeling head 17.

A conveyor 53 moves articles 55 in sequence through a labeling station. Although the articles 55 may be of different configurations, in the embodiment illustrated, each of them is in the form of a rectangular solid having a front or forward face 57 and a back or rear face 59, with each of such faces being planar, parallel and perpendicular to the direction of travel of the articles 55 through the labeling station. Each adjacent pair of the articles 55 is spaced in the direction of movement of the articles to define a gap 61.

The labeling head 17 is mounted on the supporting structure 13 for movement radially of the direction of movement of the articles 55. In the embodiment illustrated, the label applicator 11 is directly above the path along which the articles 55 move, and the labeling head 17 moves vertically from a retracted position shown in full lines in FIGS. 1 and 2 in which the labeling head is adjacent the peeler bar 15 and out of the gap 61 to an extended position shown in phantom lines in FIG. 1 in which the labeling head is in the gap 61 and spaced substantially downwardly from the peeler bar. The labeling head 17 moves along the same path from the extended position to the retracted position, and preferably, such path is linear.

Although the labeling head 17 could be mounted for movement in different ways, in the embodiment illustrated, a pair of guide rods 63 are affixed to the pad 31 (FIG. 3) and are mounted for movement within bearings 65 which are suitably mounted on the supporting structure 13 as by a mounting member 67. The labeling head 17 is powered between the extended and retracted positions by an air cylinder 69.

When mounted in this fashion, the grid 37 has a label receiving face 71 (FIG. 3) which is on a side or peripheral wall of the labeling head 17 rather than on an end wall, such as the bottom wall as viewed in FIG. 3. The label receiving face 71 faces rearwardly relative to the direction of article movement through the labeling station, and the label receiving face is transverse to this direction of movement. The labeling head 17 moves between the positions thereof along a path which generally lies in the plane of the label receiving face 71. This path also extends in the same general direction as does the label strip 21 as the label strip moves along the surface 27 toward the peeling edge 29, and the surface 27 extends generally in that same direction as viewed in FIG. 1.

The sequence of operation can be selected and varied by those having ordinary skill in the art. For example, the label applicator 11 preferably awaits one of the articles 55 with one of the labels 25 releasably retained on the label receiving face 71 by vacuum pressure within the labeling head 17 and with the labeling head 17 in the retracted position. A sensor 73 shown schematically in FIG. 1 provides a signal when the next article 55 on the conveyor reaches a predetermined location at the labeling station. In response to the signal, air under pressure is supplied to the air cylinder 69 to extend the air cylinder and move the labeling head 17 to the extended position (shown in phantom lines in FIG. 1) into the gap 61 with the label receiving face 71 and the adhesive side of the label thereon facing the forward face 57 of the approaching article 55. The movement of the label receiver 17 is properly timed relative to the advance of the articles 55 so that the labeling head 17 is properly inserted into the gap 61 even though the articles 55 may move continuously through the labeling station. Immediately upon reaching the extended position, a blast of air under pressure is supplied through the pressure port 51 and the passages 39 to blow the label 25 from the face 71 of the labeling head 17 and apply the label to the forward face 57 of the approaching article 55. The air cylinder 69 then immediately retracts to return the labeling head 17 to the retracted position shown in FIG. 1. Although the labeling head 17 could tamp the label onto the forward face 57, if desired, it preferably transfers the label to the article solely as the result of the blast of air under pressure through the pressure port 51. The movements of the labeling head 17 are preferably carried out sufficiently rapidly so that there is no contact between the labeling head and the articles 55 during the labeling operation. As soon as the labeling head 17 is moved to the retracted position, the controls 19 automatically index the label strip 21 to dispense one additional label on to the labeling head 17 whereupon the sequence described above is repeated. The controls for carrying out sequencing operations of this type are known.

If desired, the labeling head 17 can be constructed with the label receiving face 71 facing forwardly in the direction of movement of the articles 55. In this event, the label applicator 11 can be used to apply a label to the rear face 59 of each of the articles. The labeling head 17 is of relatively small size compared with the remaining portions of the applicator 11. Accordingly, the label applicator 11 can be used to apply labels to virtually any relatively inaccessible surface where external structure would prevent placing the other components of the label applicator closely adjacent to the article to be labeled. By appropriately orienting the label applicator 11 relative to the articles 55, the label applicator 11 can also be used to label the top, bottom and sides of the articles 55.

FIG. 4 shows how the label receiver 17 can be used to wedge apart articles 55 when the gap 61 is too small to fully receive the labeling head 17. When the minimum spacing between the articles 55 may be this small, the articles 55 are preferably indexed through the labeling station so that, in the position shown in FIG. 4, the articles 55 are not being moved by the conveyor 53. In this event, the sloping side surfaces 43 and 45 enter the gap 61 and cam or wedge the articles 55 apart as the labeling head 17 is moved to the extended position. In all other respects, the use and operation of the label applicator is the same as that described above with reference to FIGS. 1–3.

FIG. 5 shows a label applicator 11*a* which is identical to the label applicator 11 in all respects not shown or described herein. Portions of the label applicator 11*a* corresponding to portions of the label applicator 11 are designated by corresponding reference numerals followed by the letter "a".

The label applicator 11*a* is identical to the label applicator 11, except that the label head 17*a* is moved along a label head path P between its extended and retracted positions which is inclined with respect to the direction of movement M of the articles through the labeling station. The direction of inclination is such that, in retracting, a component of movement of the label head 17*a* is in the direction of movement M of the articles C through the labeling station. Thus, contact of the label head 17*a* and the articles is less likely to occur.

The angle of inclination of the path P can be varied depending upon the speed of movement of the articles and the spacing between the articles. By way of example, the path P may be inclined 60 degrees with respect to the direction of movement M, and if M is horizontal, the path of movement of the label head 17*a* would be inclined 30 degrees with respect to the vertical and 60 degrees with respect to the horizontal.

The label head 17*a* can be moved along the inclined path P in different ways. In the embodiment illustrated, the guide rod 63 is inclined from the vertical to define the inclined label head path P. This leaves the label receiving face 71*a* perpendicular to the direction of movement of the articles through the labeling station at all positions of the label head 17*a*. Alternatively, the entire label applicator of FIG. 1 could be inclined on its mounting structure to give the label head 17*a* the desired inclined path of movement. In this event, it is preferred to construct the label head 17*a* to maintain the label receiving face 71*a* parallel to the surface to be labeled and to maintain the peeler bar 15 at an appropriate angle with respect to the label receiving face 71 so that labels can be properly dispensed onto the face 71*a*.

Although exemplary embodiments of the invention have been shown and described, many changes, modifications and substitutions may be made by one having ordinary skill in the art without necessarily departing from the spirit and scope of this invention.

I claim:

1. A label applicator for labeling articles which are moved in a row through a labeling station wherein each of the articles has a front face and a back face with each of said front face and back face being a transverse face which faces transversely to the direction of movement of the articles, said label applicator comprising:

a supporting structure;

a labeling head;

means for mounting the labeling head on the supporting structure for movement between a retracted position in which the labeling head is out of the path of movement of the articles and an extended position in which the labeling head is in the path of movement of the articles;

dispensing means on the supporting structure for dispensing a label onto the labeling head when the labeling head is in the retracted position;

said labeling head having a label receiving face for receiving the label from the dispensing means, said label receiving face being generally transverse to the direction of article movement when the labeling head is in said extended position;

means for releasably retaining the label on the label receiving face of the labeling head;

means for moving the labeling head to said extended position so that the label receiving face is in the path of movement of the articles and generally transverse thereto;

means for transferring the label from the label receiving face of the labeling head to one of the transverse faces of the article at the labeling station while the labeling head is in the extended position; and means for moving the labeling head to the retracted position.

2. A label applicator as defined in claim 1 including means on said labeling head for wedging adjacent articles apart at said labeling station as said labeling head is moved to the extended position.

3. A label applicator as defined in claim 2 wherein said wedging means includes sloping side surfaces on said labeling head.

4. A label applicator as defined in claim 1 wherein said labeling head has a side wall and end walls and the label receiving face is on said side wall.

5. A label applicator as defined in claim 4 wherein said retaining means includes means for retaining the labels on the label receiving face with vacuum pressure and the labeling head moves along a generally linear path between the extended and retracted positions.

6. A label applicator as defined in claim 1 wherein said means for moving the labeling head to the retracted position moves the labeling head along a generally linear retraction path having a component which extends generally in the direction of movement of the articles through the labeling station.

7. A label applicator as defined in claim 6 wherein the label receiving face is inclined with respect to said retraction path.

8. A label applicator for applying labels to articles wherein the labels are supplied on an elongated backing strip, the articles are moved in a row through a labeling station and each of the articles has a front face and a back face which face transversly to the direction of movement of the article said label applicator comprising:

a supporting structure;

a peeler member mounted on said supporting structure, said peeler member having a peeling edge;

a labeling head having a side wall and a label receiving face on the side wall;

means for moving the backing strip over the peeler member generally in a first direction toward the peeling edge and over the peeling edge to remove labels from the backing strip and dispense them onto the label receiving face;

means for releasably retaining labels on the label receiving face of the labeling head;

means for mounting the labeling head on the supporting structure for movement along a path between a retracted position in which the labeling head is adjacent the peeler member to receive removed labels from the backing strip and an extended position in which the labeling head is in the path of movement of the articles and the label receiving face faces one of said faces of one of the articles, said path extending generally in said first direction; and means for transferring labels from the label receiving face of the labeling head to one of said faces of the articles when the labeling head is in the extended position.

9. A label applicator as defined in claim 8 wherein said label receiving face is generally flat and the labeling head has passage means opening at said face, said path being generally linear and generally in the plane of the label receiving face.

10. A label applicator as defined in claim 8 wherein said first direction and said path are generally vertical.

11. A label applicator as defined in claim 8 wherein said peeler member includes a peeler bar having a surface over which the backing strip is moved in moving toward the peeling edge, said surface extending generally in said first direction toward said peeling edge.

* * * * *